(12) United States Patent
Noda et al.

(10) Patent No.: US 11,857,915 B2
(45) Date of Patent: Jan. 2, 2024

(54) GAS SEPARATION METHOD AND GAS SEPARATOR

(71) Applicant: NGK INSULATORS, LTD., Nagoya (JP)

(72) Inventors: Kenichi Noda, Nagoya (JP); Kenji Yajima, Nagoya (JP); Katsuya Shimizu, Kasugai (JP)

(73) Assignee: NGK INSULATORS, LTD., Nagoya (JP)

(*) Notice: Subject to any disclaimer, the term of this patent is extended or adjusted under 35 U.S.C. 154(b) by 265 days.

(21) Appl. No.: 17/203,987

(22) Filed: Mar. 17, 2021

(65) Prior Publication Data

US 2021/0197118 A1    Jul. 1, 2021

Related U.S. Application Data

(63) Continuation of application No. PCT/JP2019/036386, filed on Sep. 17, 2019.

(30) Foreign Application Priority Data

Oct. 4, 2018 (WO) .................. PCT/JP2018/037186

(51) Int. Cl.
*B01D 53/22* (2006.01)
*B01D 71/02* (2006.01)

(52) U.S. Cl.
CPC ......... *B01D 53/228* (2013.01); *B01D 71/024* (2013.01); *B01D 2053/222* (2013.01)

(58) Field of Classification Search
None
See application file for complete search history.

(56) References Cited

U.S. PATENT DOCUMENTS

| 2004/0173094 A1 | 9/2004 | Nakayama et al. |
| 2011/0036237 A1 | 2/2011 | Okada et al. |

(Continued)

FOREIGN PATENT DOCUMENTS

| CN | 106573204 A | 4/2017 |
| CN | 107735157 A | 2/2018 |

(Continued)

OTHER PUBLICATIONS

International Search Report and Written Opinion (Application No. PCT/JP2019/036386) dated Dec. 10, 2019.

(Continued)

*Primary Examiner* — Jason M Greene
(74) *Attorney, Agent, or Firm* — BURR PATENT LAW, PLLC

(57) ABSTRACT

A gas separator includes a separation membrane complex in which a separation membrane with pores having a mean pore diameter less than or equal to 1 nm is formed on a porous support, and a gas supply part that supplies a mixed gas including $CO_2$ and another gas from the side of the separation membrane to the separation membrane complex. Then, $CO_2$ in the mixed gas is caused to permeate through the separation membrane and the support and is separated from the mixed gas in a state in which at least part of a permeation surface of the support, from which a gas having permeated through the separation membrane is exhausted, has a temperature lower by 10° C. or more than the temperature of the mixed gas before being supplied to the separation membrane complex.

12 Claims, 2 Drawing Sheets

(56) References Cited

U.S. PATENT DOCUMENTS

| | | | |
|---|---|---|---|
| 2012/0196739 A1* | 8/2012 | Uchikawa | B01D 71/028 427/430.1 |
| 2014/0283683 A1 | 9/2014 | Oguro et al. | |
| 2017/0189862 A1 | 7/2017 | Imasaka et al. | |
| 2018/0100109 A1 | 4/2018 | Eliseev et al. | |
| 2018/0185784 A1* | 7/2018 | Kodama | B01D 53/228 |
| 2018/0280866 A1* | 10/2018 | Hasegawa | B01D 53/228 |
| 2020/0346171 A1 | 11/2020 | Noda | |

FOREIGN PATENT DOCUMENTS

| | | |
|---|---|---|
| DE | 11 2019 000 832 T5 | 10/2020 |
| JP | H02-135117 A1 | 5/1990 |
| JP | H04-225777 A1 | 8/1992 |
| JP | 2000-087811 A1 | 3/2000 |
| JP | 2003-159518 A1 | 6/2003 |
| JP | 2012-236123 A1 | 12/2012 |
| JP | 2015-044162 A1 | 3/2015 |
| JP | 2017-154120 A1 | 9/2017 |
| JP | 2018-514385 A1 | 6/2018 |
| WO | 2009/093666 A1 | 7/2009 |
| WO | 2013/061474 A1 | 5/2013 |

OTHER PUBLICATIONS

Chinese Office Action dated May 26, 2022 (Application No. 201980054252.3).

English translation of the International Preliminary Report on Patentability (Chapter I) (Application No. PCT/JP2019/036386) dated Apr. 15, 2021.

German Office Action (with English translation) dated May 6, 2022 (Application No. 11 2019 004 951.8).

* cited by examiner

GAS SEPARATION METHOD AND GAS SEPARATOR

CROSS-REFERENCE TO RELATED APPLICATION

This present application is a continuation application of International Application No. PCT/JP2019/036386, filed on Sep. 17, 2019. The contents of this application are incorporated herein by reference in their entirety.

TECHNICAL FIELD

The present invention relates to a gas separation method and a gas separator.

BACKGROUND ART

The separation of gases such as carbon dioxide ($CO_2$) from a combustion exhaust gas emitted from a thermal power station or other such installation has conventionally been performed. For example, Japanese Patent Application Laid-Open No. 2003-159518 (Document 1) and Japanese Patent Application Laid-Open No. 2015-044162 (Document 2) propose techniques for separating $CO_2$ from a mixed gas with use of a zeolite membrane. International Publication WO/2009/093666 (Document 3) proposes a technique for separating $CO_2$ with use of a facilitated transport membrane.

Japanese Patent Application Laid-Open No. 2017-154120 (Document 4) proposes that, in a plurality of carbon dioxide separation membranes arranged in order in a gas flow path, the temperature of a gas supplied to a carbon dioxide separation membrane on the downstream side is set lower than the temperature of a gas supplied to a carbon dioxide separation membrane on the upstream side to increase the relative humidity of the gas supplied to the downstream carbon dioxide separation membrane in order to solve the problem that water vapor permeating through the upstream carbon dioxide separation membrane reduces the relative humidity of the gas supplied to the downstream carbon dioxide separation membrane and causes a reduction in permeability to carbon dioxide. Document 4 describes that permeability to carbon dioxide decreases as the temperature of the carbon dioxide separation membrane decreases.

Meanwhile, Japanese Unexamined Patent Application (Published Japanese translation of a PCT Application) No. 2018-514385 (Document 5) proposes a technique for separating a supplied mixture including a plurality of types of hydrocarbons with use of a porous membrane having pore diameters of 5 nm to 250 nm. According to Document 5, the porous membrane and permeated substances are maintained at temperatures lower than the temperature of the supplied mixture so as to cause capillary condensation of mixture components in the pores of the porous membrane.

Incidentally, in the case where $CO_2$ is separated and collected from a combustion exhaust gas with use of a zeolite membrane such as described in Documents 1 and 2, it is difficult to increase the concentration of $CO_2$ in a gas that has permeated through the zeolite membrane because $CO_2$ in the combustion exhaust gas has a relatively low partial pressure. With a non-porous facilitated transport membrane such as described in Document 3, it is difficult to continue stable separation for a long period of time because separation capabilities easily deteriorate with decreasing amount of moisture in the facilitated transport membrane.

Document 4 talks about the temperatures of gases supplied to a plurality of carbon dioxide separation membranes and indicates that the temperature of a gas on the downstream side is lower than the temperature of a gas on the upstream side. However, since the permeability of the carbon dioxide separation membranes to carbon dioxide decreases with a drop in temperature, it is hard to think of cooling each carbon dioxide separation membrane (i.e., a single carbon dioxide separation membrane) so as to have a lower temperature than the temperature of a gas supplied to this separation membrane.

Document 5 discloses the separation of hydrocarbon, but does not disclose the separation of $CO_2$. Besides, the pores in the porous membrane according to Document 5 have relatively large pore diameters greater than or equal to 5 nm. Thus, it is difficult to use this porous membrane for the separation of $CO_2$.

SUMMARY OF INVENTION

The present invention is directed to a gas separation method of separating carbon dioxide in a mixed gas, and it is an object of the present invention to improve the carbon dioxide selectivity in a separation membrane in order to increase the concentration of carbon dioxide in a gas that has permeated through the separation membrane.

A gas separation method according to a preferable embodiment of the present invention includes a) preparing a separation membrane complex in which a separation membrane with pores having a mean pore diameter less than or equal to 1 nm is formed on a porous support, and b) supplying a mixed gas that includes carbon dioxide and another gas from a side of the separation membrane to the separation membrane complex and obtaining a permeated gas by causing the carbon dioxide in the mixed gas to permeate through the separation membrane and the support. The operation b) is performed in a state in which at least part of a permeation surface of the support, from which the permeated gas is exhausted has a temperature lower by 10° C. or more than a temperature of the mixed gas before being supplied to the separation membrane complex. This gas separation method improves the carbon dioxide selectivity in a separation membrane.

Preferably, a carbon dioxide concentration in the permeated gas obtained in the operation b) is higher than a carbon dioxide concentration in the mixed gas.

Preferably, in the operation b), a whole of the permeation surface of the support has a temperature lower by 10° C. or more than the temperature of the mixed gas before being supplied to the separation membrane complex.

Preferably, in the operation b), at least part of the permeation surface of the support has a temperature lower by 15° C. or more than the temperature of the mixed gas before being supplied to the separation membrane complex.

Preferably, in the operation b), the mixed gas before being supplied to the separation membrane complex has a pressure higher than or equal to 1 MPa.

Preferably, the separation membrane is an inorganic membrane. More preferably, the separation membrane is a zeolite membrane. Yet more preferably, a maximum number of membered rings in a zeolite of the separation membrane is less than or equal to 8.

Preferably, in the operation b), the mixed gas before being supplied to the separation membrane complex has a moisture content lower than or equal to 3000 ppm.

Preferably, in the operation b), a non-permeated gas that is included in the mixed gas and exhausted without permeating through the separation membrane and the support has a temperature higher than a temperature of the permeation surface of the support and lower than the temperature of the mixed gas before being supplied to the separation membrane complex.

Preferably, the another gas includes one or more kind of gases including hydrogen, helium, nitrogen, oxygen, carbon monoxide, nitrogen oxide, ammonia, sulfur oxide, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

The present invention is also directed to a gas separator for separating carbon dioxide in a mixed gas. A gas separator according to a preferable embodiment of the present invention includes a separation membrane complex in which a separation membrane with pores having a mean pore diameter less than or equal to 1 nm is formed on a porous support, and a gas supply part that supplies a mixed gas including carbon dioxide and another gas from a side of the separation membrane to the separation membrane complex. The carbon dioxide in the mixed gas is caused to permeate through the separation membrane and the support and is separated from the mixed gas in a state in which at least part of a permeation surface of the support, from which a gas having permeated through the separation membrane is exhausted, has a temperature lower by 10° C. or more than a temperature of the mixed gas before being supplied to the separation membrane complex. This gas separator improves the carbon dioxide selectivity in a separation membrane.

DESCRIPTION OF EMBODIMENTS

Figure 1:
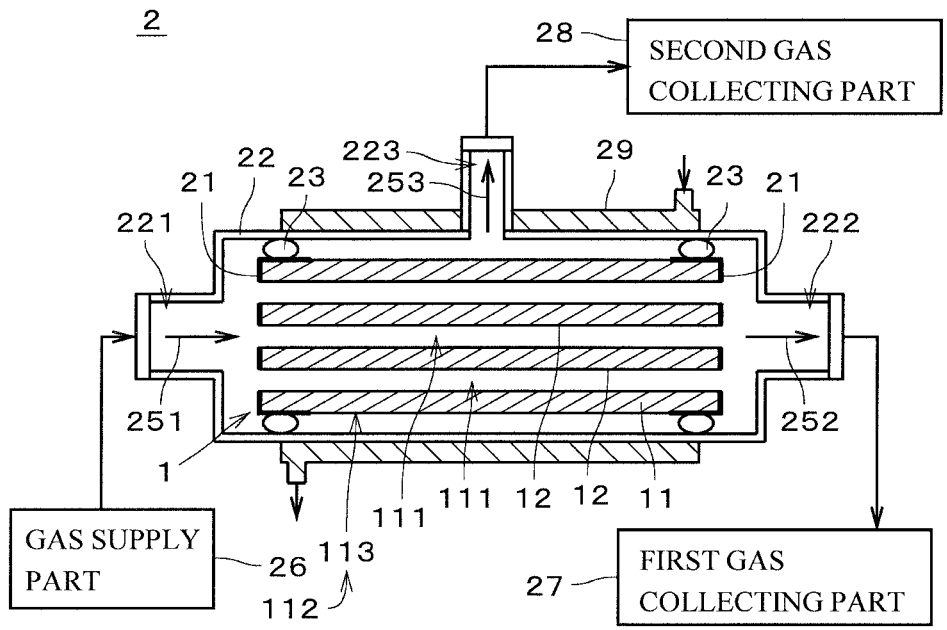
FIG. 1 is a diagram illustrating a gas separator.

FIG. 1 is a diagram illustrating a schematic structure of a gas separator 2 according to one embodiment of the present invention. In FIG. 1, cross-hatching in the sections of some components is omitted. The gas separator 2 is an apparatus that separates carbon dioxide ($CO_2$) from a mixed gas that includes carbon dioxide and other gases. For example, the mixed gas is a combustion exhaust gas emitted from a thermal power station.

The gas separator 2 includes a separation membrane complex 1, sealers 21, an outer cylinder 22, two seal members 23, and a gas supply part 26, a first gas collecting part 27, a second gas collecting part 28, and a cooler 29. The separation membrane complex 1, the sealers 21, and the seal members 23 are placed in the internal space of the outer cylinder 22. The gas supply part 26, the first gas collecting part 27, and the second gas collecting part 28 are disposed outside the outer cylinder 22 and connected to the outer cylinder 22. In the example illustrated in FIG. 1, the cooler 29 is disposed outside the outer cylinder 22 and covers the outside surface of the outer cylinder 22.

Figure 2:
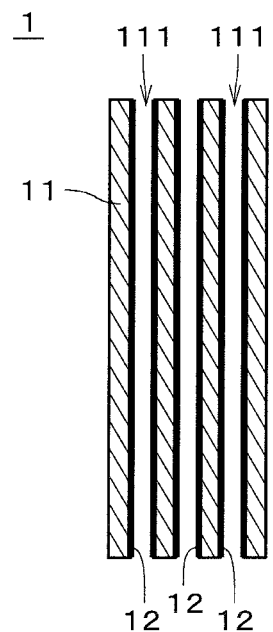
FIG. 2 is a sectional view of a separation membrane complex.
Figure 3:
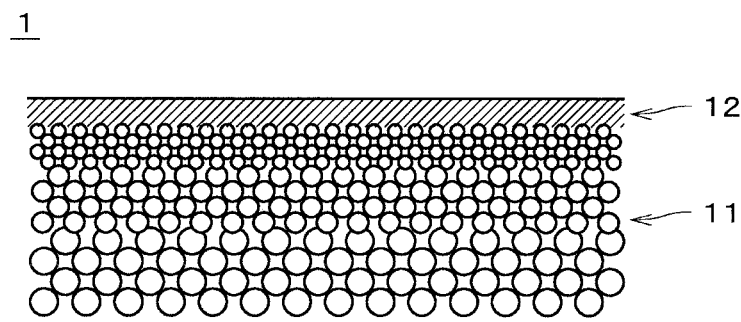
FIG. 3 is an enlarged sectional view of the separation membrane complex.

FIG. 2 is a sectional view of the separation membrane complex 1. FIG. 3 is a sectional view illustrating part of the separation membrane complex 1 in enlarged dimension. The separation membrane complex 1 includes a porous support 11 and a separation membrane 12 formed on the support 11. In FIG. 2, the separation membrane 12 is illustrated with bold lines. In FIG. 3, the separation membrane 12 is cross-hatched. The thickness of the separation membrane 12 illustrated in FIG. 3 is greater than the actual thickness.

The support 11 is a porous member that is permeable to gases. In the example illustrated in FIG. 2, the support 11 is a monolith support in which a plurality of through holes 111, each extending in a longitudinal direction (i.e., an up-down direction in FIG. 2), are formed in an integrally-molded columnar body. In the example illustrated in FIG. 2, the support 11 has a generally columnar shape. Each through hole 111 (i.e., cell) has, for example, a generally circular shape in section perpendicular to the longitudinal direction. In the illustration in FIGS. 1 and 2, the diameter of the through holes 111 is greater than the actual diameter, and the number of through holes 111 is smaller than the actual number. The separation membrane 12 is formed on the inside surfaces of the through holes 111 and covers approximately the entire inside surfaces of the through holes 111.

The support 11 has a length (i.e., length in the up-down direction in FIG. 2) of, for example, 10 cm to 200 cm. The support 11 has an outer diameter of, for example, 0.5 cm to 30 cm. A distance between the central axes of adjacent through holes 111 is, for example, in the range of 0.3 mm to 10 mm. Surface roughness (Ra) of the support 11 is, for example, in the range of 0.1 μm to 5.0 μm and preferably in the range of 0.2 μm to 2.0 μm. Alternatively, the support 11 may have a different shape such as a honeycomb shape, a flat plate shape, a tubular shape, a cylindrical shape, a columnar shape, or a polygonal prism shape. When the support 11 has a tubular or cylindrical shape, the thickness of the support 11 is, for example, in the range of 0.1 mm to 10 mm.

As the material for the support 11, various substances (e.g., ceramic or metal) may be employed as long as they are chemically stable during the step of forming the zeolite membrane 12 on the surface of the support. In the present embodiment, the support 11 is formed of a ceramic sintered compact. Examples of the ceramic sintered compact that is selected as the material for the support 11 include alumina, silica, mullite, zirconia, titania, yttrium, silicon nitride, and silicon carbide. In the present embodiment, the support 11 contains at least one of alumina, silica, and mullite.

The support 11 may contain an inorganic binder. The inorganic binder may be at least one of titania, mullite, easily sinterable alumina, silica, glass frit, clay minerals, and easily sinterable cordierite.

A mean pore diameter of the support 11 in the vicinity of the surface where the separation membrane 12 is formed is preferably smaller than a mean pore diameter of the support 11 in the other portions. To achieve this structure, the support 11 has a multilayer structure. When the support 11 has a multilayer structure, the material for each layer may be any of the materials described above, and each layer may be formed of the same material, or may be formed of a different material. The mean pore diameter of the support 11 can be measured using an apparatus such as a mercury porosimeter, a perm porometer, or a nano-perm porometer.

The mean pore diameter of the support 11 is, for example, in the range of 0.01 μm to 70 μm and preferably in the range of 0.05 μm to 25 μm. The mean pore diameter of the support 11 in the vicinity of the surface where the separation membrane 12 is formed is in the range of 0.01 μm to 1 μm and preferably in the range of 0.05 μm to 0.5 μm. In a pore size distribution of the entire support 11 including the surface and inside of the support 11, D5 is, for example, in the range of 0.01 μm to 50 μm, D50 is, for example, in the range of 0.05 μm to 70 μm, and D95 is, for example, in the range of 0.1 μm to 2000 μm. A porosity of the support 11 in the vicinity of the surface where the separation membrane 12 is formed is, for example, in the range of 25% to 50%.

The separation membrane 12 is a porous membrane with small pores. The separation membrane 12 is a gas separation membrane that separates $CO_2$ from a mixed gas of a plurality of types of gases, using a molecular sieving function. This mixed gas includes other gases that are less likely to permeate through the separation membrane 12 than $CO_2$. In other words, the mixed gas includes other gases that have lower permeances than the $CO_2$ permeance of the separation membrane 12. The mixed gas includes, in addition to $CO_2$, one or more types of gases including hydrogen ($H_2$), helium (He), nitrogen ($N_2$), oxygen ($O_2$), carbon monoxide (CO), nitrogen oxide, ammonia ($NH_3$), sulfur oxide, hydrogen sulfide ($H_2S$), sulfur fluoride, mercury (Hg), arsine ($AsH_3$), hydrogen cyanide (HCN), carbonyl sulfide (COS), C1 to C8 hydrocarbons, organic acid, alcohol, mercaptans, ester, ether, ketone, and aldehyde. Separating $CO_2$ refers to causing at least part of $CO_2$ in the mixed gas to permeate through the separation membrane 12 and the support 11, and the concentration of the gas will not be discussed here. In the following description, a gas that has permeated through the separation membrane 12 and the support 11 is also referred to as a "permeated gas."

Nitrogen oxide is a compound of nitrogen and oxygen. The aforementioned nitrogen oxide is, for example, a gas called NOx such as nitrogen monoxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), or dinitrogen pentoxide ($N_2O_5$).

Sulfur oxide is a compound of sulfur and oxygen. The aforementioned sulfur oxide is, for example, a gas called $SO_X$ such as sulfur dioxide ($SO_2$) or sulfur trioxide ($SO_3$).

Sulfur fluoride is a compound of fluorine and sulfur. The aforementioned sulfur fluoride is, for example, disulfur difluoride (F—S—S—F, S=$SF_2$), sulfur difluoride ($SF_2$), sulfur tetrafluoride ($SF_4$), sulfur hexafluoride ($SF_6$), or disulfur decafluoride ($S_2F_{10}$).

C1 to C8 hydrocarbons are hydrocarbons containing one or more and eight or less carbon atoms. C3 to C8 hydrocarbons each may be any of a linear-chain compound, a side-chain compound, and a cyclic compound. C2 to C8 hydrocarbons each may be either a saturated hydrocarbon (i.e., the absence of a double bond and a triple bond in a molecule) or an unsaturated hydrocarbons (i.e., the presence of a double bond and/or a triple bond in a molecule). C1 to C4 may, for example, be methane ($CH_4$), ethane ($C_2H_6$), ethylene ($C_2H_4$), propane ($C_3H_8$), propylene ($C_3H_6$), normal butane ($CH_3(CH_2)_2CH_3$), isobutane ($CH(CH_3)_3$), 1-butene ($CH_2$=$CHCH_2CH_3$), 2-butene ($CH_3CH$=$CHCH_3$), or isobutene ($CH_2$=$C(CH_3)_2$).

The aforementioned organic acid may, for example, be carboxylic acid or sulfonic acid. The carboxylic acid may, for example, be formic acid ($CH_2O_2$), acetic acid ($C_2H_4O_2$), oxalic acid ($C_2H_2O_4$), acrylic acid ($C_3H_4O_2$), or benzoic acid ($C_6H_5COOH$). The sulfonic acid may, for example, be ethane sulfonic acid ($C_2H_6O_3S$). The organic acid may, for example, be either a chain compound or a cyclic compound.

The aforementioned alcohol may, for example, be methanol ($CH_3OH$), ethanol ($C_2H_5OH$), isopropanol (2-propanol) ($CH_3CH(OH)CH_3$), ethylene glycol ($CH_2(OH)CH_2(OH)$), or butanol ($C_4H_9OH$).

The mercaptans are organic compounds with terminal sulfur hydride (SH) and are also substances called thiol or thioalcohol. The aforementioned mercaptans may, for example, be methyl mercaptans ($CH_3SH$), ethyl mercaptans ($C_2H_5SH$), or 1-propane thiols ($C_3H_7SH$).

The aforementioned ester may, for example, be formic acid ester or acetic acid ester.

The aforementioned ether may, for example, be dimethyl ether (($CH_3)_2O$), methyl ethyl ether ($C_2H_5OCH_3$), or diethyl ether (($C_2H_5)_2O$).

The aforementioned ketone may, for example, be acetone (($CH_3)_2CO$), methyl ethyl ketone ($C_2H_5COCH_3$), or diethyl ketone (($C_2H_5)_2CO$).

The aforementioned aldehyde may, for example, be acetaldehyde ($CH_3CHO$), propionaldehyde ($C_2H_5CHO$), or butanal (butyraldehyde) ($C_3H_7CHO$).

The separation membrane 12 has a thickness of, for example, 0.05 µm to 30 µm, preferably 0.1 µm to 20 µm, and more preferably 0.5 µm to 10 µm. Increasing the thickness of the separation membrane 12 improves the selectivity. Reducing the thickness of the separation membrane 12 increases the permeance. Surface roughness (Ra) of the separation membrane 12 is, for example, less than or equal to 5 µm, preferably less than or equal to 2 µm, more preferably less than or equal to 1 µm, and yet more preferably less than or equal to 0.5 µm. The separation membrane 12 has a mean pore diameter less than or equal to 1 nm. This improves the $CO_2$ selectivity through the separation membrane 12. There are no particular limitations on the lower limit of the mean pore diameter of the separation membrane 12 as long as $CO_2$ can permeate through the separation membrane, but for example, the lower limit may be set greater than or equal to 0.2 nm. The mean pore diameter of the separation membrane 12 is preferably greater than or equal to 0.2 nm and less than or equal to 0.8 nm, more preferably greater than or equal to 0.3 nm and less than or equal to 0.6 nm, and yet more preferably greater than or equal to 0.3 nm and less than or equal to 0.5 nm. Reducing the mean pore diameter of the separation membrane 12 improves the selectivity. Increasing the mean pore diameter of the separation membrane 12 increases the permeance. The mean pore diameter of the separation membrane 12 is smaller than the mean pore diameter in the surface of the support 11 where the separation membrane 12 is provided.

The separation membrane 12 is preferably an inorganic membrane, and in the present embodiment, a zeolite membrane (i.e., a zeolite in membrane form). Examples of the zeolite of the separation membrane 12 include a zeolite in which atoms (T atoms) located in the center of an oxygen tetrahedron ($TO_4$) constituting the zeolite are composed of only Si or composed of Si and Al, an AlPO-type zeolite in which the T atoms are composed of Al and P, an SAPO-type zeolite in which the T atoms are composed of Si, Al, and P, an MAPSO-type zeolite in which T atoms are composed of magnesium (Mg), Si, Al, and P, and a ZnAPSO-type zeolite in which T atoms are composed of zinc (Zn), Si, Al, and P. Some of the T atoms may be replaced by other elements.

When n represents a maximum number of membered rings in the zeolite of the separation membrane 12, an arithmetical mean of the major and minor axes of an n-membered ring pore is assumed to be a mean pore diameter. The n-membered ring pore as used herein refers to a pore whose number of oxygen atoms that are bonded to T atoms and make a ring structure is n. When the zeolite has a plurality of n-membered ring pores where n is the same number, an arithmetical mean of the major and minor axes of all n-membered ring pores is assumed to be the mean pore diameter of the zeolite. In this way, the mean pore diameter of the zeolite membrane is uniquely determined by the framework structure of the zeolite and can be obtained from a value disclosed in "Database of Zeolite Structures" [online] by the International Zeolite Association on the Internet <URL:http://www.iza-structure.org/databases/>.

There are no particular limitations on the type of the zeolite of the separation membrane 12, and the zeolite may be any of the following types including AEI-type, AEN-type, AFN-type, AFV-type, AFX-type, BEA-type, CHA-type, DDR-type, ERI-type, ETL-type, FAU-type (X-type, Y-type), GIS-type, LEV-type, LTA-type, MEL-type, MFI-type, MOR-type, PAU-type, RHO-type, SAT-type, and SOD-type. From the viewpoint of increasing the $CO_2$ permeance and improving the $CO_2$ selectivity, which will be described later, the maximum number of membered rings in the zeolite is preferably less than or equal to 8 (e.g., 6 or 8). For example, the separation membrane 12 is a DDR-type zeolite. In other words, the separation membrane 12 is a zeolite membrane composed of a zeolite having a framework type code "DDR" assigned by the International Zeolite Association. In this case, the zeolite of the separation membrane 12 has an intrinsic pore diameter of 0.36 nm×0.44 nm and a mean pore diameter of 0.40 nm.

When the separation membrane 12 is a zeolite membrane, the separation membrane 12 contains, for example, silicon (Si). For example, the separation membrane 12 may contain any two or more of Si, aluminum (Al), and phosphorus (P). The separation membrane 12 may contain alkali metal. The alkali metal is, for example, sodium (Na) or potassium (K). When the separation membrane 12 contains Si atoms, an Si/Al ratio in the separation membrane 12 is, for example, higher than or equal to 1 and lower than or equal to 100,000. The Si/Al ratio is preferably higher than or equal to 5, more preferably higher than or equal to 20, and yet more preferably higher than or equal to 100. This ratio is preferably as high as possible. The Si/Al ratio in the separation membrane 12 can be adjusted by, for example, adjusting the composition ratio of an Si source and an Al source in a starting material solution, which will be described later.

The $CO_2$ permeance of the separation membrane 12 at temperatures of −50° C. to 300° C. is, for example, greater than or equal to 50 nmol/m²·s·Pa. The ratio (permeance ratio) between the $CO_2$ permeance and the $CH_4$ permeance (leakage) of the zeolite membrane 12 at temperatures of −50° C. to 300° C. is, for example, higher than or equal to 30. The permeance and the permeance ratio are values for the case where a difference in the partial pressure of $CO_2$ between the supply side and the permeation side of the zeolite membrane 12 is 1.5 MPa.

The sealers 21 are members mounted on the opposite ends of the support 11 in the longitudinal direction (i.e., right-left direction in FIG. 1) and covering and sealing the opposite end faces of the support 11 in the longitudinal direction and the outside surface of the support 11 in the vicinity of the opposite end faces. The sealers 21 prevent the inflow and outflow of gases from the opposite end faces of the support 11. The sealers 21 are, for example, plate-like members formed of glass or resin. The material and shape of the sealers 21 may be appropriately changed. The sealers 21 has a plurality of openings that overlap with a plurality of through holes 111 of the support 11, and therefore the opposite ends in the longitudinal direction of each through hole 111 of the support 11 are not covered with the sealers 21. Accordingly, the gas can flow in and out from the opposite ends through the through holes 111.

The outer cylinder 22 is a generally cylindrical tubular member. The outer cylinder 22 is formed of, for example, stainless steel or carbon steel. The longitudinal direction of the outer cylinder 22 is approximately parallel to the longitudinal direction of the separation membrane complex 1.

The outer cylinder 22 has a gas supply port 221 on one end in the longitudinal direction (i.e., left end in FIG. 5) and a first gas exhaust port 222 on the other end. The outer cylinder 22 also has a second exhaust port 223 on the side surface. The gas supply port 221 is connected to the gas supply part 26. The first gas exhaust port 222 is connected to the first gas collecting part 27. The second gas exhaust port 223 is connected to the second gas collecting part 28. An internal space of the outer cylinder 22 is an enclosed space isolated from the space around the outer cylinder 22.

The two seal members 23 are arranged around the entire circumference between the outside surface 112 of the separation membrane complex 1 (i.e., outside surface 112 of the support 11) and the inside surface of the outer cylinder 22 in the vicinity of the opposite ends of the zeolite membrane complex 1 in the longitudinal direction. Each seal member 23 is a generally ring-shaped member formed of a material that is impermeable to gases. For example, the seal members 23 are O-rings formed of a resin having flexibility. The seal members 23 are in intimate contact with the outside surface 112 of the separation membrane complex 1 and the inside surface of the outer cylinder 22 around the entire circumference. In the example illustrated in FIG. 1, the seal members 23 are in tight contact with the outside surfaces of the sealers 21 and are indirectly in tight contact with the outside surface 112 of the separation membrane complex 1 via the sealers 21. A space between the seal members 23 and the outside surface 112 of the separation membrane complex 1 and a space between the seal members 23 and the inside surface of the outer cylinder 22 are sealed so as to almost or completely disable the passage of gases.

The gas supply part 26 supplies a mixed gas including $CO_2$ and other gases (e.g., nitrogen ($N_2$)) into the internal space of the outer cylinder 22 through the gas supply port 221. For example, the gas supply part 26 is a blower or pump that transmits the mixed gas toward the outer cylinder 22 under pressure. This blower or pump includes a pressure regulator that regulates the pressure of the mixed gas supplied to the outer cylinder 22.

The mixed gas supplied from the gas supply part 26 to the inside of the outer cylinder 22 is led from the left end of the separation membrane complex 1 in the drawing into each through hole 111 of the support 11, as indicated by an arrow 251. In the mixed gas, $CO_2$ is led out of the outside surface 112 of the support 11 while permeating through the separation membrane 12 provided on the inside surface of each through hole 111 and the support 11, and is collected by the second gas collecting part 28 through the second gas exhaust port 223 as indicated by an arrow 253. In other words, the gas supply part 26 supplies the aforementioned mixed gas to the separation membrane complex 1 from the side of the separation membrane 12 and separates $CO_2$ in the mixed gas from the mixed gas by causing $CO_2$ to permeate through the separation membrane 12 and the support 11 and to be exhausted out of a generally cylindrical area of the outside surface 112 of the support 11 that is located between the two seal members 23 (hereinafter, this area is referred to as a "permeation surface 113"). Note that the permeation surface 113 does not include an area of the outside surface 112 of the support 11 that is covered with the sealers 21. The second gas collecting part 28 may, for example, be a reservoir for storing a permeated gas such as $CO_2$ that is led out of the outer cylinder 22 while permeating through the separation membrane 12 and the support 11, or may be a blower or pump that transfers the permeated gas.

In the mixed gas, a gas other than the aforementioned permeated gas (hereinafter referred to as "a non-permeated gas) passes through each through hole 111 of the support 11 from the left side to the right side in the drawing, and is collected by the first gas collecting part 27 through the first gas discharge port 222 as indicated by an arrow 252. For example, the first gas collecting part 27 may be a reservoir for storing a non-permeated gas led out of the outer cylinder 22, or may be a blower or pump that transfers the non-permeated gas.

The cooler 29 is in direct or indirect contact with the outside surface of the outer cylinder 22 and cools the outer cylinder 22. For example, the cooler 29 is a generally cylindrical cooling jacket provided around the outer cylinder 22. In this case, the outer cylinder 22 is cooled as a result of a cooling medium such as cooling water flowing continuously through the inside of the cooler 29. In FIG. 1, the cooling medium in the cooler 29 is cross-hatched. The length of the cooler 29 in the aforementioned longitudinal direction is, for example, approximately the same as the distance in the longitudinal direction between the two seal members 23, or may be longer than this distance. In the example illustrated in FIG. 1, the opposite ends of the cooler 29 are located at approximately the same positions in the longitudinal direction as the positions of the two seal members 23.

In the gas separator 2, the separation membrane complex 1 that faces the inside surface of the outer cylinder 22 is also cooled as a result of the outer cylinder 22 being cooled by the cooler 29. To be more specific, as a result of the outer cylinder 22 being cooled by the cooler 29, the gas existing between the inside surface of the outer cylinder 22 and the outside surface 112 of the support 11 is cooled, and approximately the entire support 11 is cooled from the side of the outside surface 112 that is in contact with the gas. As a result, approximately the entire separation membrane 12 having contact with the support 11 is also cooled.

Figure 4:
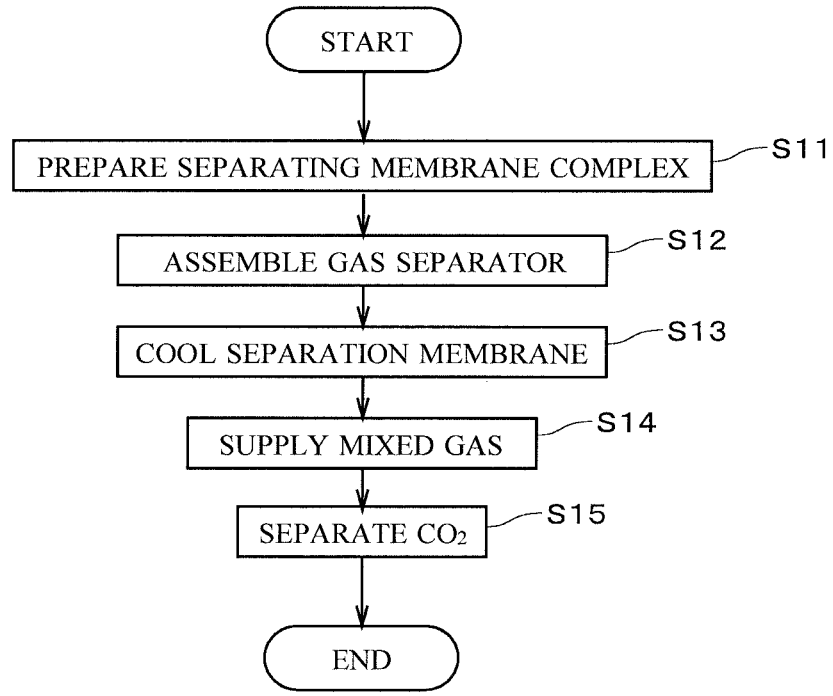
FIG. 4 is a diagram illustrating a procedure for separating a mixed gas.

Next, one example of the procedure for separating a mixed gas, performed by the gas separator 2, will be described with reference to FIG. 4. For the separation of a mixed gas, first, the separation membrane complex 1 is prepared by forming the separation membrane 12 on the support 11 (step S11). When step S11 is described more specifically, first, seed crystals for use in the production of the separation membrane 12 (i.e., zeolite membrane) are prepared. For example, the seed crystals are acquired from DDR-type zeolite powder synthesized by hydrothermal synthesis. The zeolite powder may be used as-is as the seed crystals, or may be processed into the seed crystals by pulverization or other methods.

Then, the porous support 11 is immersed in a solution in which the seed crystals are dispersed, so as to deposit the seed crystals on the support 11. Alternatively, a solution in which the seed crystals are dispersed may be brought into contact with a portion of the support 11 on which the separation membrane 12 is desired to be formed, so as to deposit the seed crystals on the support 11. In this way, a seed-crystal-deposited support is prepared. The seed crystals may be deposited on the support 11 by the other methods.

The support 11 with the seed crystals deposited thereon is immersed in a starting material solution. The starting material solution is prepared by, for example, causing substances such as an Si source and a structure-directing agent (hereinafter, also referred to as an "SDA") to dissolve or disperse in a solvent. The starting material solution has a composition of, for example, 1:0.15:0.12 of $SiO_2:SDA:(CH_2)_2(NH_2)_2$. The solvent in the starting material solution may, for example, be water or alcohol such as ethanol. The SDA in the starting material solution may, for example, be an organic compound. For example, 1-adamantanamine may be used as the SDA.

Then, using the seed crystals as nuclei, the DDR-type zeolite is grown by hydrothermal synthesis to form a DDR-type zeolite membrane, i.e., the separation membrane 12, on the support 11. The temperature of the hydrothermal synthesis is preferably in the range of 120 to 200° C., and for example, 160° C. The time of the hydrothermal synthesis is preferably in the range of 10 to 100 hours, and for example, 30 hours.

When the hydrothermal synthesis has ended, the support 11 and the separation membrane 12 are rinsed with deionized water. After the rinsing, the support 11 and the separation membrane 12 are, for example, dried at 80° C. After the support 11 and the separation membrane 12 have been dried, the separation membrane 12 is subjected to heat treatment so as to almost completely burn and remove the SDA in the separation membrane 12 and cause micropores in the separation membrane 12 to come through the membrane. In this way, the aforementioned zeolite membrane complex 1 is obtained.

When step S11 has ended, the gas separator 2 illustrated in FIG. 1 is assembled (step S12). The separation membrane complex 1 is installed in the outer cylinder 22. Then, the cooler 29 cools the separation membrane complex 1 via the outer cylinder 22. Specifically, the cooler 29 cools the portion of the outer cylinder 22 that is located between the two seal members 23, so that in the portion between the two seal members 23, the gas existing between the inside surface of the outer cylinder 22 and the outside surface 112 of the support 11 is cooled. Moreover, the permeation surface 113 of the support 11, which is the area having contact with the gas, is cooled, approximately the entire support 11 is cooled, and approximately the entire separation membrane 12 is also cooled (step S13). The cooling of the separation membrane complex 1 by the cooler 29 continues until the gas separator 2 ends the gas separation processing.

Then, the gas supply part 26 supplies a mixed gas including $CO_2$ and other gases to the internal space of the outer cylinder 22 (step S14). In the present embodiment, the mixed gas is primarily composed of $CO_2$ and $N_2$. The mixed gas may also include gases other than $CO_2$ and $N_2$. Moisture in the mixed gas inhibits adsorption of $CO_2$ into the pores of the separation membrane 12 and suppresses a reduction in $CO_2$ permeance. Thus, in the internal space of the outer cylinder 22, the moisture content in the mixed gas before supplied to the separation membrane complex 1 is preferably lower than or equal to 3000 ppm according to the volume ratio (i.e., molar ratio), more preferably lower than or equal to 1000 ppm, yet more preferably lower than or equal to 500 ppm, and in particular preferably lower than or equal to 100 ppm. If the moisture content in the mixed gas is higher than 3000 ppm, it is possible to use a mixed gas obtained by lowering the moisture content to 3000 ppm or less by a dehydrator.

The pressure of the mixed gas supplied from the gas supply part 26 to the internal space of the outer cylinder 22, i.e., initial gas pressure, is preferably higher than or equal to 0.5 MPa, more preferably higher than or equal to 1 MPa, and yet more preferably higher than or equal to 2 MPa. The initial gas pressure is also, for example, lower than or equal to 20 MPa and typically lower than or equal to 10 MPa. The temperature of the mixed gas supplied from the gas supply part 26 to the internal space of the outer cylinder 22 is, for example, in the range of −50° C. to 300° C., and in the present embodiment, approximately in the range of 10° C. to 150° C. In the internal space of the outer cylinder 22, the mixed gas before supplied to the separation membrane complex 1 (i.e., mixed gas immediately before supplied to the separation membrane 12) has approximately the same pressure and the same temperature as the pressure and temperature of the mixed gas supplied from the aforementioned gas supply part 26 to the internal space of the outer cylinder 22.

The mixed gas supplied into the outer cylinder 22 is led to each through hole 111 of the separation membrane complex 1. Then, $CO_2$ in the mixed gas permeates through the separation membrane 12 and the support 11 of the separation membrane complex 1, is led out from the permeation surface 113 of the support 11, and is separated from the mixed gas (step S15).

As described above, the support 11 is cooled by the cooler 29. Thus, the temperature of the support 11 is lower than the temperature of the mixed gas before supplied to the separation membrane complex 1 (i.e., mixed gas that has flowed from the gas supply port 221 toward the separation membrane 12 and that is immediately before supplied to the separation membrane 12). Specifically, the temperature of at least part of the permeation surface 113 of the support 11 is lower by 10° C. or more than the temperature of the mixed gas. Note that the temperature of the permeation surface 113 of the support 11 and the temperature of the gas immediately after having permeated through the support 11 are approximately the same. Thus, if it is difficult to directly measure the temperature of the permeation surface 113 of the support 11, it can be said, from the fact that the temperature of the gas immediately after having permeated through the support 11 is lower by 10° C. or more than the temperature of the mixed gas before supplied to the separation membrane complex 1, that the temperature of at least part of the permeation surface 113 of the support 11 is lower by 10° C. or more than the temperature of the mixed gas.

When the gas separator 2 includes a plurality of separation membrane complexes, in at least one of the separation membrane complexes 1, the temperature of at least part of the permeation surface 113 of the support 11 in the separation membrane complex 1 is lower by 10° C. or more than the temperature of the mixed gas immediately before supplied to the separation membrane 12 in the separation membrane complex 1.

Preferably, the temperature of the entire permeation surface 113 of the support 11 is lower by 10° C. or more than the temperature of the mixed gas before supplied to the separation membrane complex 1. The temperature of the entire permeation surface 113 does not necessarily have to be lower by 10° C. or more than the temperature of the aforementioned mixed gas, and it is also preferable that the temperature of at least part of the permeation surface 113 is lower by 15° C. or more than the temperature of the mixed gas. More preferably, the temperature of the entire permeation surface 113 of the support 11 is lower by 15° C. or more than the temperature of the mixed gas before supplied to the separation membrane complex 1.

As described above, in the gas separator 2, at least the temperature of part of the permeation surface 113 of the support 11 is lower by 10° C. or more than the temperature of the mixed gas before supplied to the separation membrane complex 1. This allows $CO_2$ to be efficiently adsorbed into the pores of the separation membrane 12 and thereby increases the ratio of the $CO_2$ permeance of the separation membrane 12 to the other permeance thereof such as the $N_2$ permeance. In other words, the $CO_2$ selectivity of the separation membrane 12 improves. Preferably, the concentration of $CO_2$ in the permeated gas that has permeated through the separation membrane 12 and the support 11 is made higher than the concentration of $CO_2$ in the mixed gas.

The permeated gas that has permeated through the separation membrane complex 1 is collected by the second gas collecting part 28. The pressure of the gas in the second gas collecting part 28 (i.e., permeation-side pressure) may be arbitrarily set, and for example, set to a pressure of approximately one atmosphere (0.101 MPa). The permeated gas collected by the second gas collecting part 28 may also include other gases different from $CO_2$.

A non-permeated gas (i.e., a gas not having permeated through the separation membrane 12 and the support 11 in the mixed gas) passes through each through hole 111 in the longitudinal direction and is exhausted out of the outer cylinder 22 through the first gas discharge port 222. The non-permeated gas having passed through the through holes 111 in the separation membrane complex 1 is cooled by the separation membrane complex 1 whose temperature is lower than the temperature of the mixed gas. Therefore, the temperature of the non-permeated gas immediately after having passed through the through holes 111 is lower than the temperature of the mixed gas before supplied to the separation membrane complex 1 (i.e. mixed gas having flowed from the gas supply port 221 toward the separation membrane 12 and immediately before supplied to the separation membrane 12). The non-permeated gas immediately after having passed through the through holes 111 is preferably higher than the temperature of the permeation surface 113 of the support 11. The temperature of the non-permeated gas immediately after having passed through the through holes 111 is also preferably higher than the temperature of the permeated gas immediately after having permeated through the separation membrane complex 1. Note that the temperature of the non-permeated gas immediately after having passed through the through holes 111 is approximately the same as the temperature of the non-permeated gas exhausted through the first gas discharge port 222.

The non-permeated gas exhausted out of the outer cylinder 22 is collected by the first gas collecting part 27. For example, the pressure of the gas in the first gas collecting part 27 is approximately the same as the pressure of the mixed gas supplied by the gas supply part 26. The non-permeated gas collected by the first gas collecting part 27 may include $CO_2$ that has not permeated through the separation membrane complex 1.

Next, the relation of a difference in temperature between the mixed gas immediately before supplied to the separation membrane 12 and the permeation surface 113, the pressure of the mixed gas immediately before supplied to the separation membrane 12, the $CO_2$ flux, and the $CO_2$ selectivity in the gas separation method illustrated as steps S11 to S15 described above will be described with reference to Table 1. Examples 1 to 5 and Comparative Examples 1 and 2 in Table 1 vary in temperature difference $\Delta T$ (° C.) between the mixed gas immediately before supplied to the separation membrane 12 and the permeation surface 13 and in pressure P (MPa) of the mixed gas immediately before supplied to the separation membrane 12. The temperature difference $\Delta T$(° C.) is obtained by subtracting the temperature of an area of the permeation surface 113 that has a lowest temperature from the temperature of the above-described mixed gas.

Although not shown in Table 1, the separation membranes 12 according to Examples 1 to 5 and Comparative Examples 1 and 2 are DDR-type zeolite membranes. The mixed gas (except moisture) supplied from the gas supply part 26 to the gas separator 2 has a composition ratio of 50% by volume of $CO_2$ and 50% by volume of $N_2$. The moisture content in the mixed gas is 3000 ppm. The temperature of the mixed gas immediately before supplied to the separation membrane 12 is 30° C. The pressure in the second gas collecting part 28 (i.e., permeation-side pressure) is set to a pressure of one atmosphere.

In Table 1, $CO_2$ flux and $CO_2$ selectivity were obtained as follows. First, the flow rate and composition of the permeated gas that permeated through the separation membrane complex 1 were respectively measured using a mass flow meter and a gas chromatography. Then, the $CO_2$ permeance and the $N_2$ permeance of the separation membrane 12 were obtained from the measured values of the flux and composition of the permeated gas. Moreover, the permeance of $CO_2$ and $N_2$ per unit area, per unit time, and per unit pressure were obtained, respectively, and a value obtained by dividing the $CO_2$ permeance by the $N_2$ permeance was assumed to be the $CO_2$ selectivity. That is, the $CO_2$ selectivity in Table 1 corresponds to the ratio of the $CO_2$ permeance to the $N_2$ permeance. As the numerical value in Table 1 increases, the $CO_2$ selectivity improves and the ratio (vol %) of $CO_2$ in the permeated gas increases.

TABLE 1

| | Temperature of Mixed Gas ° C. | Temperature of Permeation Surface ° C. | Temperature Difference ΔT ° C. | Pressure of Mixed Gas MPa | $CO_2$ Flux (L/min) | $CO_2$ selectivity |
|---|---|---|---|---|---|---|
| Example 1 | 30 | 20 | 10 | 0.4 | 8.8 | 60.7 |
| Example 2 | 30 | 20 | 10 | 1.0 | 22.9 | 42.6 |
| Example 3 | 60 | 50 | 10 | 2.0 | 36.7 | 30.9 |
| Example 4 | 30 | 15 | 15 | 1.0 | 22.6 | 50.7 |
| Example 5 | 30 | 10 | 20 | 1.0 | 22.4 | 56.8 |
| Comparative Example 1 | 30 | 25 | 5 | 0.4 | 8.9 | 49.8 |
| Comparative Example 2 | 30 | 30 | 0 | 0.4 | 9.0 | 44.3 |

As shown in Table 1, in Examples 1 to 3 with a temperature difference ΔT of 10° C., the $CO_2$ selectivity is higher than or equal to 30.9, and the $CO_2$ flux increases as the pressure of the mixed gas increases. In Examples 2, 4, and 5 with a pressure of the mixed gas of 1.0 MPa, the $CO_2$ flux is almost the same, and the $CO_2$ selectivity improves with increasing temperature difference ΔT. In Examples 2 to 5 with a pressure of the mixed gas higher than or equal to 1.0 MPa, the $CO_2$ flux is higher than or equal to 22.4 liters (L)/min. Meanwhile, when Comparative Examples 1 and 2 with a temperature difference ΔT less than 10° C. are compared with Example 1 with the same pressure of the mixed gas, these examples show almost the same $CO_2$ flux, and differ in $CO_2$ selectivity, specifically 60.7 in Example 1, 49.8 in Comparative Example 1, and 44.3 in Comparative Example 2.

In Examples 1 to 5, if the moisture content in the mixed gas was reduced to be less than 3000 ppm, the $CO_2$ permeance and the $CO_2$ selectivity became equivalent to or improved from the results shown in Table 1. In Examples 1 to 5, the temperature of the non-permeated gas (i.e., the temperature of the non-permeated gas immediately after having passed through the through holes 111) was lower than the temperature of the mixed gas before supplied to the separation membrane complex 1 (i.e., the mixed gas immediately before supplied to the separation membrane 12) and higher than the temperature of the permeation surface 113 of the support 11.

Although not shown in Table 1, if the separation membrane 12 was changed from the DDR type zeolite membrane to a CHA-type or Y-type (FAU-type) zeolite membrane, the $CO_2$ selectivity also improved as a result of setting the temperature difference ΔT to be greater than or equal to 10° C. as described above. The $CO_2$ selectivity further improved in the case of using a DDR-type or CHA-type zeolite membrane composed of a zeolite whose maximum number of membered rings was 8, rather than in the case of using a Y-type zeolite membrane composed of a zeolite whose maximum number of membered rings was 12. Similarly, when the separation membrane 12 was replaced by an inorganic membrane such as a carbon or silica membrane other than a zeolite membrane, the $CO_2$ selectivity also improved as a result of setting the temperature difference ΔT to be greater than or equal to 10° C. as described above.

As described above, the gas separation method of separating $CO_2$ in a mixed gas includes the step of preparing the separation membrane complex 1 in which the separation membrane 12 with pores having a mean particle diameter less than or equal to 1 nm is formed on the porous support 11 (step S11), and the step of supplying a mixed gas including $CO_2$ and other gases from the side of the separation membrane 12 to the separation membrane complex 1 and obtaining a permeated gas by causing $CO_2$ in the mixed gas to permeate through the separation membrane 12 and the support 11 (step S14). Step S14 is performed in a state in which the temperature of at least part of the permeation surface 113 of the support 11, from which the permeated gas is exhausted, is lower by 10° C. or more than the temperature of the mixed gas before supplied to the separation membrane complex 1.

This enables reducing the temperature of the separation membrane 12 to be lower than the temperature of the mixed gas and causing $CO_2$ to be efficiently adsorbed in the pores of the separation membrane 12. As a result, it is possible to improve the $CO_2$ selectivity of the separation membrane 12. According to this gas separation method, it is possible to reduce the amount of energy required for cooling more than in the case where the whole of the mixed gas is cooled before supplied to the separation membrane 12.

In the above-described gas separation method, the $CO_2$ concentration in the permeated gas obtained in step S14 is higher than the $CO_2$ concentration in the aforementioned mixed gas. This accelerates the separation of $CO_2$ in the separation membrane 12.

In the above-described gas separation method, it is preferable in step S14 that the temperature of the entire permeation surface 113 of the support 11 is lower by 10° C. or more than the temperature of the mixed gas before supplied to the separation membrane complex 1. This further improves the $CO_2$ selectivity of the separation membrane 12.

In the above-described gas separation method, it is preferable in step S14 that the temperature of at least part of the permeation surface 113 of the support 11 is lower by 15° C. or more than the temperature of the mixed gas before supplied to the separation membrane complex 1. This further improves the $CO_2$ selectivity of the separation membrane 12.

In the above-described gas separation method, it is preferable in step S14 that the pressure of the mixed gas before supplied to the separation membrane complex 1 is higher than or equal to 1 MPa. This increases the $CO_2$ flux in the separation membrane 12.

As described above, the separation membrane 12 is preferably an inorganic membrane. This, as described above, favorably enables increasing the $CO_2$ permeance in the separation membrane 12 and improving the $CO_2$ selectivity. Examples of the inorganic membrane include a zeolite membrane, a silica membrane, and a carbon membrane.

More preferably, the separation membrane 12 is a zeolite membrane. Using a zeolite membrane having an intrinsic pore diameter as the separation membrane 12 in this way makes it possible to further improve the $CO_2$ selectivity of the separation membrane 12. Note that the zeolite membrane as used herein refers to at least a membrane obtained by forming a zeolite in membrane form on the surface of the support 11, and does not include a membrane obtained by simply dispersing zeolite particles in an organic membrane.

More preferably, a maximum number of membered rings in the zeolite of the separation membrane 12 is less than or equal to 8. This further improves the $CO_2$ selectivity of the separation membrane 12.

In the above-described gas separation method, it is preferable in step S14 that the moisture content in the mixed gas before supplied to the separation membrane complex 1 is less than or equal to 3000 ppm. This reduces a situation in which moisture in the mixed gas inhibits the adsorption of $CO_2$ in the pores of the separation membrane 12. As a result, it is possible to further increase the $CO_2$ permeance in the separation membrane 12 and to further improve the $CO_2$ selectivity.

In step S14 of the above-described gas separation method, the whole of the mixed gas is not cooled before supplied to the separation membrane 12, and the permeated gas is cooled by contact with the separation membrane 12. Thus, according to this gas separation method, it is possible to reduce the amount of energy required for cooling more than in the case where the whole of the mixed gas is cooled before supplied to the separation membrane 12. In step S14 of the above-described gas separation method, the temperature of the non-permeated gas exhausted without permeating through the separation membrane 12 and the support 11 in the mixed gas is preferably higher than the temperature of the permeation surface 113 of the support 11 and lower than the temperature of the mixed gas before supplied to the separation membrane complex 1. This suppresses cooling of the non-permeated gas and thereby further reduces the amount of energy required for cooling.

As described above, according to the gas separation method, it is possible to improve the $CO_2$ selectivity of the separation membrane 12. Accordingly, this gas separation method is particularly suitable for the case of separating $CO_2$ from a mixed gas of $CO_2$ and another gas (i.e., a gas including at least one kind of gases including hydrogen, helium, nitrogen, oxygen, carbon monoxide, nitrogen oxide, ammonia, sulfur oxide, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde).

The above-described gas separator 2 includes the separation membrane complex 1 in which the separation membrane 12 with pores having a mean pore diameter less than or equal to 1 nm is formed on the porous support 11, and the gas supply part 26 that supplies a mixed gas including $CO_2$ and another gas from the side of the separation membrane 12 to the separation membrane complex 1. Then, $CO_2$ in the mixed gas is separated from the mixed gas by causing $CO_2$ to permeate through the separation membrane 12 and the support 11 in a state in which the temperature of at least part of the permeation surface 113, from which the gas having permeated through the separation membrane 12 is exhausted, is lower by 10° C. or more than the temperature of the mixed gas before supplied to the separation membrane complex 1.

This, as described above, allows the temperature of the separation membrane 12 to be lower than the temperature of the mixed gas and allows $CO_2$ to be efficiently adsorbed in the pores of the separation membrane 12. As a result, it is possible to improve the $CO_2$ selectivity of the separation membrane 12. According to this gas separator, it is possible to reduce the amount of energy required for cooling more than in the case where the whole of the mixed gas is cooled before supplied to the separation membrane 12.

The gas separator 2 and the gas separation method described above may be modified in various ways.

For example, gases included in the mixed gas, other than $CO_2$, may include a gas other than those given as examples in the above description, or may include only a gas other than those given as examples in the above description.

The moisture content in the mixed gas before supplied to the separation membrane 12 may be higher than 3000 ppm. As described above, the pressure of the mixed gas may be less than 1 MPa.

The temperature of the non-permeated gas immediately after having passed through the through holes 111 may be approximately the same as the temperature of the mixed gas before supplied to the separation membrane complex 1 (i.e., the mixed gas immediately before supplied to the separation membrane 12). The temperature of the non-permeated gas may also be approximately the same as the temperature of the permeation surface 113 of the support 11.

When the separation membrane 12 is a zeolite membrane, a maximum number of membered rings in the zeolite of this zeolite membrane may be less than 8, or may be greater than 8. As described above, the separation membrane 12 is not limited to a zeolite membrane, and may be an inorganic membrane formed of inorganic substances other than a zeolite. The separation membrane 12 may also be a membrane other than inorganic membranes.

While the separation membrane complex 1 includes the separation membrane 12 formed on the support 11, the separation membrane complex 1 may further include a functional membrane or a protective membrane laminated on the separation membrane 12. Such a functional membrane or a protective membrane may be an inorganic membrane such as a zeolite membrane, a silica membrane, or a carbon membrane, or may be an organic membrane such as a polyimide membrane or a silicone membrane. Moreover, a substance that can easily adsorb $CO_2$ may be added to such a functional membrane or a protective membrane laminated on the separation membrane 12.

The gas separator 2 may include a generally tubular or cylindrical single tube-type separation membrane complex, instead of the aforementioned monolith type separation membrane complex 1. A mode is also possible in which the separation membrane is provided on the outside surface of a generally tubular or cylindrical support, and $CO_2$ that has permeated through the separation membrane and the support is led out to a space located radially inward of the support. There may be sealers, or there may be no sealers. In this case, the permeation surface corresponds to the inside surface of the generally tubular or cylindrical support. As a cooler, the gas separator 2 may include a cooling tube or the like that extends in the longitudinal direction in a central portion of the space located radially inward of the support.

The shape and structure of the cooler 29 may be modified in various ways. For example, the cooler 29 may be a tube-like cooling jacket that is wound spirally on the outside surface of the outer cylinder 22. A cooling medium flowing through the cooling jacket may be a liquid or slurry other than cooling water, or may be a cooled gas. A permeated gas that has permeated through the separation membrane complex 1 may be used as this cooled gas. Alternatively, the cooler 29 may be a Peltier device provided on the outside surface of the outer cylinder 22.

As a method of cooling the separation membrane complex 1, the separation membrane complex 1 may be cooled by causing a low-temperature gas to flow as a sweep gas in contact with the permeation surface, or the Joule-Thomson effect by the permeation of the gas may be used for cooling. In this case, the cooler 29 may be omitted if it is possible to make the temperature of at least part of the permeation surface 113 lower by 10° C. or more than the temperature of the mixed gas before supplied to the separation membrane complex 1. Even in this case, it is possible to improve the $CO_2$ selectivity of the separation membrane 12 in the same manner as described above.

The configurations of the above-described embodiment and variations may be appropriately combined as long as there are no mutual inconsistencies.

INDUSTRIAL APPLICABILITY

The gas separator and the gas separation method according to the present invention are applicable for use as a device or method for separating $CO_2$ in a combustion exhaust gas emitted from a thermal power station or other such installation, and are also applicable in separating $CO_2$ in a variety of other mixed gases.

REFERENCE SIGNS LIST

1 Separation membrane complex
2 Gas separator
11 Support
12 Separation membrane
26 Gas supply part
113 Permeation surface
S11 to S15 Step

The invention claimed is:
1. A gas separation method of separating carbon dioxide in a mixed gas, comprising:
a) preparing a separation membrane complex in which a separation membrane with pores having a mean pore diameter less than or equal to 1 nm is formed on a porous support; and
b) supplying a mixed gas that includes carbon dioxide and another gas from a side of said separation membrane to said separation membrane complex and obtaining a permeated gas by causing the carbon dioxide in said mixed gas to permeate through said separation membrane and said support,
wherein said operation b) is performed by feeding said mixed gas to said separation membrane in a state in which at least part of a permeation surface of said support, from which said permeated gas is exhausted, has a temperature lower by 10° C. or more than a temperature of said mixed gas before being supplied to said separation membrane complex.

2. The gas separation method according to claim 1, wherein
a carbon dioxide concentration in said permeated gas obtained in said operation b) is higher than a carbon dioxide concentration in said mixed gas.

3. The gas separation method according to claim 1, wherein
in said operation b), a whole of said permeation surface of said support has a temperature lower by 10° C. or more than the temperature of said mixed gas before being supplied to said separation membrane complex.

4. The gas separation method according to claim 1, wherein
in said operation b), at least part of said permeation surface of said support has a temperature lower by 15° C. or more than the temperature of said mixed gas before being supplied to said separation membrane complex.

5. The gas separation method according to claim 1, wherein
in said operation b), said mixed gas before being supplied to said separation membrane complex has a pressure higher than or equal to 1 MPa.

6. The gas separation method according to claim 1, wherein
said separation membrane is an inorganic membrane.

7. The gas separation method according to claim 6, wherein
said separation membrane is a zeolite membrane.

8. The gas separation method according to claim 7, wherein
a maximum number of membered rings in a zeolite of said separation membrane is less than or equal to 8.

9. The gas separation method according to claim 1, wherein
in said operation b), said mixed gas before being supplied to said separation membrane complex has a moisture content lower than or equal to 3000 ppm.

10. The gas separation method according to claim 1, wherein
in said operation b), a non-permeated gas that is included in said mixed gas and exhausted without permeating through said separation membrane and said support has a temperature higher than a temperature of said permeation surface of said support and lower than the temperature of said mixed gas before being supplied to said separation membrane complex.

11. The gas separation method according to claim 1, wherein
said another gas includes one or more kind of gases including hydrogen, helium, nitrogen, oxygen, carbon monoxide, nitrogen oxide, ammonia, sulfur oxide, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

12. A gas separator for separating carbon dioxide in a mixed gas, comprising:
a separation membrane complex in which a separation membrane with pores having a mean pore diameter less than or equal to 1 nm is formed on a porous support;
an outer cylinder that houses said separation membrane complex in an inner space;
a cooler that covers an outside surface of said outer cylinder and cools said separation membrane by cooling said outer cylinder; and a gas supply part that supplies a mixed gas including carbon dioxide and another gas to said internal space of said outer cylinder and to said separation membrane complex from a side of said separation membrane, wherein the carbon dioxide in said mixed gas is caused to permeate through said separation membrane and said support and is separated from said mixed gas by feeding said mixed gas to said separation membrane in a state in which at least part of a permeation surface of said support, from which a gas having permeated through said separation membrane is exhausted, has a temperature lower by 10° C. or more than a temperature of the mixed gas before being supplied to the said separation membrane complex.

* * * * *